US012665095B2

(12) United States Patent
Song et al.

(10) Patent No.: US 12,665,095 B2
(45) Date of Patent: Jun. 23, 2026

(54) HEAT TRANSFER STRUCTURE OF DIVERTOR

(71) Applicant: HEFEI INSTITUTES OF PHYSICAL SCIENCE, CHINESE ACADEMY OF SCIENCES, Hefei (CN)

(72) Inventors: Yuntao Song, Hefei (CN); Xuebing Peng, Hefei (CN); Xin Mao, Hefei (CN); Fangzhou Song, Hefei (CN); Xinyuan Qian, Hefei (CN); Wei Song, Hefei (CN)

(73) Assignee: HEFEI INSTITUTES OF PHYSICAL SCIENCE, CHINESE ACADEMY OF SCIENCES, Hefei City (CN)

( * ) Notice: Subject to any disclaimer, the term of this patent is extended or adjusted under 35 U.S.C. 154(b) by 111 days.

(21) Appl. No.: 18/649,924

(22) Filed: Apr. 29, 2024

(65) Prior Publication Data

US 2024/0290506 A1 Aug. 29, 2024

(30) Foreign Application Priority Data

Jun. 14, 2023 (CN) ......................... 202310709761.3

(51) Int. Cl.
*F28F 21/08* (2006.01)
*F28F 1/00* (2006.01)
*G21B 1/13* (2006.01)

(52) U.S. Cl.
CPC ................ *G21B 1/13* (2013.01); *F28F 1/003* (2013.01); *F28F 21/083* (2013.01); *F28F 21/085* (2013.01); *F28F 2245/02* (2013.01); *F28F 2245/04* (2013.01)

(58) Field of Classification Search
CPC . G21B 1/13; F28F 1/008; F28F 21/083; F28F 21/085
See application file for complete search history.

(56) References Cited

U.S. PATENT DOCUMENTS

| | | | | |
|---|---|---|---|---|
| 2023/0272537 A1* | 8/2023 | Tada | ........................ | C23C 14/10 427/253 |
| 2025/0095872 A1* | 3/2025 | Bamber | ................... | G21B 1/13 |

FOREIGN PATENT DOCUMENTS

| | | | | |
|---|---|---|---|---|
| CN | 114001568 A | 2/2022 | | |
| CN | 115188498 A | * 10/2022 | ............... | G21B 1/11 |
| CN | 115985524 A | * 4/2023 | ............... | G21B 1/05 |
| CN | 108418545 B | * 12/2024 | ........... | H02S 40/425 |

* cited by examiner

*Primary Examiner* — Devon Lane

(57) ABSTRACT

A divertor heat transfer structure, including a divertor first wall, a hydrophilic film, an outer pipe and an inner pipe. The outer pipe is sleeved on the inner pipe. The divertor first wall is arranged at an end of the outer pipe. The divertor first wall, an inner wall of the outer pipe and an outer wall of the inner pipe enclose a flow chamber. An end of the inner wall facing the divertor first wall is provided with a jet hole, through which the flow chamber is communicated with the inner pipe. The hydrophilic film is arranged on a side of the divertor first wall facing the jet hole, and fixedly connected with the divertor first wall. Through the arrangement of the hydrophilic film at an inner wall of the divertor first wall, a liquid-supply path can be separated from a steam-discharge channel when exposed to heat.

8 Claims, 4 Drawing Sheets

HEAT TRANSFER STRUCTURE OF DIVERTOR

CROSS-REFERENCE TO RELATED APPLICATIONS

This application claims the benefit of priority from Chinese Patent Application No. 202310709761.3, filed on Jun. 14, 2023. The content of the aforementioned application, including any intervening amendments thereto, is incorporated herein by reference in its entirety.

TECHNICAL FIELD

This application relates to divertors for nuclear fusion, and more particularly to a heat transfer structure of a divertor.

BACKGROUND

Subcooled flow boiling is a common cooling method for divertors because of its excellent heat transfer performance. However, regarding the current mono-block or hypervapotron water-cooled divertors, due to the structural limitations, the liquid and bubbles exist in the same area during the cooling of subcooled water on a high-temperature wall surface. As the heat load on the divertor increases, the heat flux at the fluid-side heat exchange wall surface increases. When the heat flux exceeds a critical value, a large number of bubbles generated by water vaporization form a gas film on the wall surface to form film boiling, which results in sharp deterioration of the heat transfer performance and eventually the occurrence of dry-out, resulting in a burnout and failure of a divertor structure and seriously threatening the stable operation and safety of a fusion reactor. Therefore, it is important to improve the heat load-bearing capacity of the divertor and inhibitor avoid the dry-out phenomenon for ensuring the stable and high-power operation capacity and safety of the fusion reactor.

It has been demonstrated that the heat exchange performance can be enhanced by increasing a flow rate or a subcooling degree, introducing an internal screw thread or a twisted strip, and adjusting the fin size. However, these schemes will increase the structural complexity and the working pressure of water, and reduce the engineering feasibility. Even so, the film boiling is still not essentially improved. Therefore, it is urgent to design a heat transfer structure of the divertor to solve the above problem.

SUMMARY

An object of this application is to provide a heat transfer structure of a divertor, which can effectively enhance the heat transfer capacity of divertor.

In order to arrive at the above purpose, the present disclosure provides a heat transfer structure of a divertor, comprising:

a divertor first wall;

a hydrophilic film;

an outer pipe; and an inner pipe;

wherein the outer pipe is sleevedly provided on the inner pipe; the divertor first wall is arranged at a first end of the outer pipe; the divertor first wall, an inner wall of the outer pipe and an outer wall of the inner pipe are configured to enclose a flow chamber; an end of the inner pipe facing toward the divertor first wall is provided with a jet hole; the flow chamber is communicated with an interior of the inner pipe through the jet hole; and the hydrophilic film is arranged on a side of the divertor first wall facing toward the jet hole, and is fixedly connected with the divertor first wall.

In an embodiment, the heat transfer structure of a divertor further comprises a plurality of heat conduction columns; and the plurality of heat conduction columns are protrudingly provided on the side of the divertor first wall facing toward the jet hole, and are arranged in an array.

In an embodiment, the divertor first wall is provided with a groove; the groove is located between the plurality of heat conduction columns; and a cavity is provided between the groove and the hydrophilic film.

In an embodiment, the heat transfer structure of a divertor further comprises a condenser pipe; the outer pipe is provided through the condenser pipe, and an axial direction of the outer pipe intersects with an axial direction of the condenser pipe; and an outer wall of the outer pipe and an inner wall of the condenser pipe are configured to enclose a coolant channel.

In an embodiment, a hydrophobic layer is provided on the inner wall of the outer pipe, and the hydrophobic layer is provided at least partially opposite to the coolant channel.

In an embodiment, the outer pipe comprises a first cylinder segment, a cone segment and a second cylinder segment connected in sequence; a diameter of the first cylinder segment is greater than a diameter of the second cylinder segment; an end of the first cylinder segment away from the cone segment is configured as the first end of the outer pipe, and an end of the second cylinder segment away from the cone segment is configured as a second end of the outer pipe; and at least part of the second cylinder segment and at least part of the cone segment are located within the condenser pipe.

In an embodiment, the hydrophilic film is composed of stacked $SiO_2$ filaments.

In an embodiment, the jet hole is provided in plurality, and a plurality of jet holes are arranged in an array at an end face of the inner pipe.

In an embodiment, the divertor first wall comprises a first material layer, a second material layer and a third material layer stacked in sequence from a side away from the first end of the outer pipe to a side close to the first end of the outer pipe; the first material layer is made of a tungsten material, the second material layer is made of an oxygen-free copper material, and the third material layer is made of a chromium zirconium copper (CrZrCu) material, the third material layer is integrally formed with the plurality of heat conduction columns; and the outer pipe is made of a stainless-steel material.

In an embodiment, the heat transfer structure of a divertor further comprises a connection part; the divertor first wall is connected with the first end of the outer pipe through the connection part; the divertor first wall comprises a fourth material layer and a fifth material layer stacked in sequence from the side away from the first end of the outer pipe to the side close to the first end of the outer pipe; the fourth material layer is made of the tungsten material, the connection part is made of the CrZrCu material, and the outer pipe is made of the stainless-steel material.

Compared to the prior art, the present disclosure has the following beneficial effects.

The divertor heat transfer structure provided herein is especially suitable for the high-power and long-pulse operation of Tokamak devices. In this application, the hydrophilic film is arranged on an inner surface of the divertor first wall, such that the liquid-supply path is separated from a steam-discharge channel when exposed to heat, which can effectively avoid the occurrence of film boiling.

Figure 1:
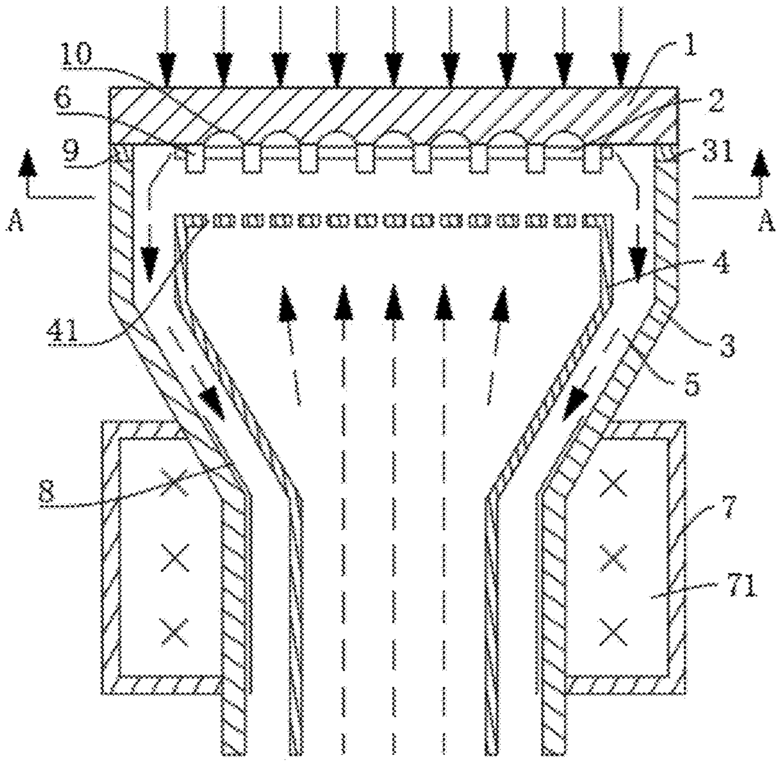
FIG. 1 is a sectional view of a heat transfer structure of a divertor according to an embodiment of the present disclosure.

In the figures: 1, divertor first wall; 10, groove; 11, first material layer; 12, second material layer; 13, third material layer; 14, fourth material layer; 15, fifth material layer; 2, hydrophilic film; 3, outer pipe; 31, first end; 4, inner pipe; 41, jet hole; 5, flow chamber; 6, heat conduction column; 7, condenser pipe; 71, coolant channel; 8, hydrophobic layer; and 9, connection part.

DETAILED DESCRIPTION OF EMBODIMENTS

The present disclosure will be further described below with reference to the accompanying drawings and embodiments. It should be understood that the embodiments described herein are only to illustrate rather than limiting the present disclosure.

It should be understood that as used herein, the orientation or position relationship indicated by the terms "up", "down", "front", "back", "left", "right", "vertical", "horizontal", "top", "bottom", "inside" or "outside" is based on the orientation or position relationship shown in the accompanying drawings, and are only for facilitating and simplifying the description rather than indicating or implying that the devices or components must have a particular orientation, or be constructed and operated in a particular orientation, therefore, they cannot be understood as a limitation of this application.

As used herein, it should be understood that the terms "link", "connection" and "fix" should be understood in a broad sense, for example, it can be fixed connection, removable connection or integral connection; it may be mechanical connection or welded connection; it may be direction connection or indirect connection through an intermediate component; and it may be internal communication between two components or the interaction between two components, unless otherwise defined. For those of ordinary skill in the art, the specific meanings can be determined according to the context.

In this application, the terms "first" and "second" are only used for description and distinguishing the components of the same type. For example, without departing from the spirit of this application, "first" information can be named "second" information, similarly, "second" information can be also named "first" information.

In a Tokamak fusion device, the divertor is directly exposed to plasmas with a temperature of hundreds of millions of degrees, and assumes a function of eliminating the high flux, and its thermal bearing ability plays an important role in the generation and maintenance of high-performance plasmas, and directly influences the long-pulse steady-state high-power operation level of a fusion reactor. During the operation, a side of the divertor facing toward the plasmas bears an extremely high heat load, and in the design of International Thermonuclear Experimental Reactor (ITER), the heat load can reach 10 $MW/m^2$ during the steady state, and an instantaneous peak of 20 $MW/m^2$, and will be higher in the future commercial fusion reactors.

Chinese and foreign studies have found that taking measures, such as increasing a flow rate or a subcooling degree, increasing an internal screw thread or a twisted strip, and adjusting a size of a fin, can increase a certain heat exchange performance. But it will increase a structural complexity, improve a working pressure of water, and reduce a process feasibility. Even so, the film boiling is still not fundamentally improved. A heat transfer structure of a divertor of the present disclosure is provided to solve the above problems.

In the description, it should be understood that, the term an outer surface of the divertor first wall 1 refers to a surface of the divertor in contact with a high temperature heat flow, that is, a side of the divertor first wall away from a jet hole 41 in a preferred embodiment of the present disclosure; the term an inner surface of the divertor first wall refers to a surface where an inner coolant performs heat transfer, that is, a side of the divertor facing toward the jet hole in a preferred embodiment of the present disclosure.

Referring to FIG. 1, a heat transfer structure of a divertor is provided, including a divertor first wall 1, a hydrophilic film 2, an outer pipe 3 and an inner pipe 4. The outer pipe 3 is sleevedly provided on the inner pipe 4. The divertor first wall 1 is arranged at a first end 31 of the outer pipe 3. The divertor first wall 1, an inner wall of the outer pipe 3 and an outer wall of the inner pipe 4 are configured to enclose a flow chamber 5. An end of the inner pipe 4 facing toward the divertor first wall 1 is provided with a jet hole 41. The flow chamber 5 is communicated with an interior of the inner pipe 4 through the jet hole 41. And the hydrophilic film 2 is arranged on a side of the divertor first wall 1 facing toward the jet hole 41, and is fixedly connected with the divertor first wall 1. The hydrophilic film 2 has a porous film structure. A specific flow process of a coolant is that the coolant, from outside, flows into the inner pipe 4, pass upwards through the jet hole 41 to cool the inner surface of the divertor first wall 1, after the hydrophilic film 2 is infiltrated by the coolant, steam generated by boiling disperses on an inner side of the hydrophilic film 2, flows to two sides of the hydrophilic film 2, along the flow chamber 5 between the outer pipe 3 and the inner pipe 4 to cool the inner wall of the outer pipe 3, and the steam is condensed into drops to flow out. In this way, heat of a high temperature heat flow passes through the divertor first wall 1 to exchange heat with the coolant, and the hydrophilic film 2 is used to separate a liquid-supply path and a steam-discharge channel, which effectively avoids an occurrence of film boiling.

Figure 2:
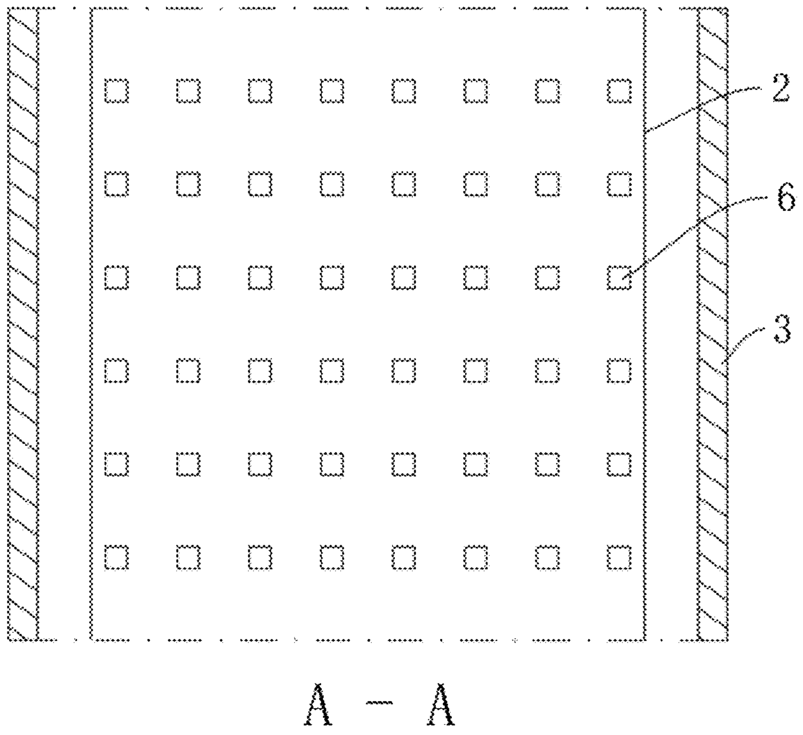
FIG. 2 is a sectional view of the heat transfer structure in FIG. 1 along an A-A line.

Referring to FIG. 2, in some embodiments, the heat transfer structure further includes a plurality of heat conduction columns 6. And the plurality of heat conduction columns 6 are protrudingly provided on the side of the divertor first wall 1 facing toward the jet hole 41, and are arranged in an array. The plurality of heat conduction columns 6 are provided through the hydrophilic film 2 and are connected to the divertor first wall 1 to transfer heat, which facilitates heat transfer of the high temperature heat flow and the coolant and increase a contact area. In an embodiment, the plurality of heat conduction columns 6 are configured to be machined and formed directly on an outermost structural material of the divertor first wall 1 facing toward the jet hole 41, which can better transfer heat to the coolant.

In some embodiments, the divertor first wall 1 is provided with a groove 10. The groove 10 is located between the plurality of heat conduction columns 6. And a cavity is provided between the groove 10 and the hydrophilic film 2. The hydrophilic film 2 is configured to separate the liquid-supply path and the steam-discharge channel, which effectively avoids the occurrence of film boiling and has advantages of simple processing technology, low cost and short cycle. The plurality of heat conduction columns 6 and the hydrophilic film 2 are provided to allow the drops to continuously contact a high temperature surface and keep continuously boiling, which enhances an overall heat exchange effect.

In some embodiments, the heat transfer structure of further includes a condenser pipe 7. The outer pipe 3 is provided through the condenser pipe 7, and an axial direction of the outer pipe 3 intersects with an axial direction of the condenser pipe 7. An outer wall of the outer pipe 3 and an inner wall of the condenser pipe 7 are configured to enclose a coolant channel. The outer pipe 3 is fixedly connected with the divertor first wall 1, and is fixedly connected with the condenser pipe 7 to lead a coolant flow and support the divertor first wall 1. And the outer pipe 3 is sleevedly provided outside the inner pipe 4 to form a cooling circuit with the inner pipe 4.

In some embodiments, a hydrophobic layer 8 is provided on the inner wall of the outer pipe 3, and the hydrophobic layer 8 is provided at least partially opposite to the coolant channel. The hydrophobic layer 8 has a super hydrophobic structure. A main component of the hydrophobic layer 8 is siloxane polymer, which is laid on the inner wall of the outer pipe 3, especially on a connection of the outer pipe 3 and the condenser pipe. The hydrophobic layer 8 is configured to increase a contact angle of a liquid drop and decrease a sliding angle of the liquid drop, so that drops generated by condensing will not accumulate, which avoids film condensation and increase a condensation effect. In an embodiment, the axial direction of the outer pipe 3 is configured to be perpendicular to the axial direction of the condenser pipe 7. The steam generated by boiling is further cooled during passing through the hydrophobic layer 8 along the flow chamber 5 between the outer pipe 3 and the inner pipe 4, condenses into liquid drops, and flows out. A "cross" in FIG. 1 indicates that the coolant in the coolant channel flows perpendicular to a drawing surface.

In some embodiments, the outer pipe 3 includes a first cylinder segment, a cone segment and a second cylinder segment connected in sequence. A diameter of the first cylinder segment is greater than a diameter of the second cylinder segment. An end of the first cylinder segment away from the cone segment is configured as the first end 31 of the outer pipe 3, and an end of the second cylinder segment away from the cone segment is configured as a second end of the outer pipe 3. And at least part of the second cylinder segment and at least part of the cone segment are located within the condenser pipe 7.

In some embodiments, the hydrophilic film 2 is composed of stacked $SiO_2$ filaments to form the porous film structure. The hydrophilic film 2 is fixedly connected with the side of the divertor first wall 1 facing toward the jet hole 41 by means of extrusion and sintering to promote boiling heat exchange.

In an embodiment, the jet hole 41 is provided in plurality, and a plurality of jet holes 41 are arranged in an array at an end face of the inner pipe 4. And the plurality of jet holes 41 are configured for coolant diversion.

In some embodiments, the divertor first wall 1, as a component bearing a high flux load in the heat transfer structure, is configured to transfer the heat to the plurality of heat conduction columns 6, and can be made of different materials.

Figure 3:
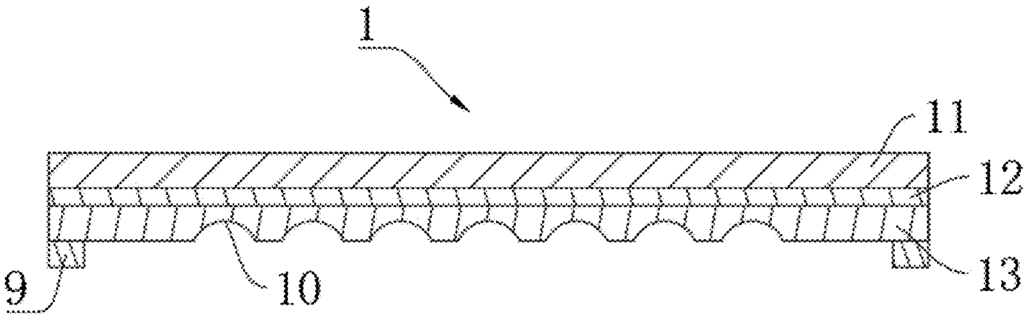
FIG. 3 is a schematic diagram of a divertor first wall of the heat transfer structure according to an embodiment of the present disclosure.

Referring to FIG. 3, in some embodiments, the divertor first wall 1 includes a first material layer 11, a second material layer 12 and a third material layer 13 stacked in sequence from a side away from the first end 31 of the outer pipe 3 to a side close to the first end 31 of the outer pipe 3. The first material layer 11 is made of a tungsten material, the second material layer 12 is made of an oxygen-free copper material, and the third material layer 13 is made of a chromium zirconium copper (CrZrCu) material, where the third material layer 13 is integrally formed with the plurality of heat conduction columns 6. The outer pipe 3 is made of a stainless steel material, and can specifically be a 316L stainless steel material. In this embodiment, the heat transfer structure includes a connection part 9. The divertor first wall 1 is connected with the first end 31 of the outer pipe 3 through the connection part 9. The connection part 9 is made of the stainless steel material, and can specifically be the 316L stainless steel material.

Figure 4:
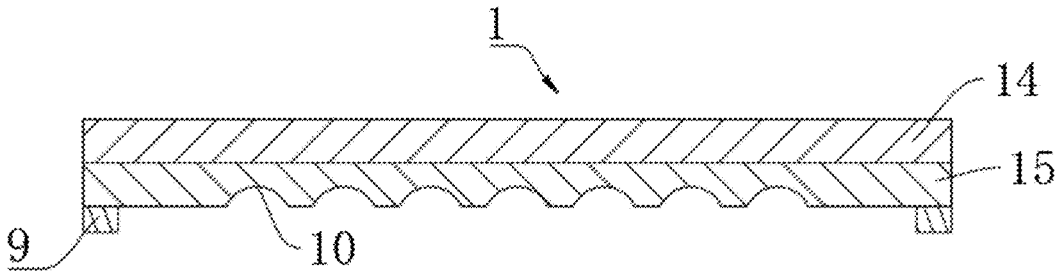
FIG. 4 is another schematic diagram of the divertor first wall according to an embodiment of the present disclosure.

Referring to FIG. 4, in some embodiment, the heat transfer structure further includes the connection part 9. The divertor first wall 1 is connected with the first end 31 of the outer pipe 3 through the connection part 9. The divertor first wall 1 includes a fourth material layer 14 and a fifth material layer 15 stacked in sequence from a side away from the first end 31 of the outer pipe 3 to a side close to the first end 31 of the outer pipe 3. The fourth material layer 14 is made of the tungsten material, the fifth material layer 15 is made of a tungsten-lanthanum alloy material, and the plurality of heat conduction columns 6 are integrally formed with the fifth material layer 15. The connection part 9 is made of the CrZrCu material, and the outer pipe 3 is made of the stainless steel material, and can specifically be the 316L stainless steel material.

In the heat transfer structure, a specific flow process of the coolant is that the coolant, from outside, flows into the inner pipe 4, pass upwards through the plurality of jet hole 41 to cool the inner surface of the divertor first wall 1, after the hydrophilic film 2 is infiltrated by the coolant, the steam generated by boiling disperses on an inner side of the hydrophilic film 2, flows to the two sides of the hydrophilic film 2, along the flow chamber 5 between the outer pipe 3 and the inner pipe 4 to be further cooled, by the coolant in the condenser pipe 7 during passing through the hydrophobic layer 8, and the steam is condensed into the drops to flow out. In this way, the heat of the high temperature heat flow passes through the divertor first wall 1 along the plurality of heat conduction columns 6 to transfer the heat with the coolant, such that the heat is carried away by the coolant to achieve the heat exchange effect.

The heat transfer structure of a divertor is especially suitable for a Tokamak device.

In summary, the heat transfer structure of a divertor of the present disclosure applies the hydrophilic film 2 and a super hydrophobic structure material to a heat transfer structure of the divertor first wall 1 for the first time, and the hydrophilic film 2 and the plurality of heat conduction columns 6 are arranged on an inner surface of the heat transfer structure of a divertor. When heated, the liquid-supply path is separated from the steam-discharge channel, which effectively avoids the occurrence of film boiling. At the same time, the hydrophobic layer 8 and the condenser pipe 7 are provided to enhance a heat exchange ability, which has the advantages of simple processing technology, low cost and short cycle.

Described above are only preferred embodiments of this application, which are not intended to limit this application. It should be noted that any improvements and equivalent replacements made by those ordinary skill in the art without departing from the spirit of this application shall fall within the scope of this application defined by the appended claims.

What is claimed is:

1. A heat transfer structure of a divertor, comprising:

a divertor first wall;

a hydrophilic film;

an outer pipe;

an inner pipe; and a plurality of heat conduction columns;

wherein the outer pipe is sleevedly provided on the inner pipe; the divertor first wall is arranged at a first end of the outer pipe; the divertor first wall, an inner wall of the outer pipe and an outer wall of the inner pipe are configured to enclose a flow chamber; an end of the inner pipe facing toward the divertor first wall is provided with a jet hole; the flow chamber is communicated with an interior of the inner pipe through the jet hole; and the hydrophilic film is arranged on a side of the divertor first wall facing toward the jet hole, and is fixedly connected with the divertor first wall;

the plurality of heat conduction columns are protrudingly provided on the side of the divertor first wall facing toward the jet hole, and are arranged in an array; and the divertor first wall is provided with a groove; the groove is located between the plurality of heat conduction columns; and a cavity is provided between the groove and the hydrophilic film.

2. The heat transfer structure of claim 1, wherein the hydrophilic film is composed of stacked $SiO_2$ filaments.

3. The heat transfer structure of claim 1, wherein the jet hole is provided in plurality, and a plurality of jet holes are arranged in an array at an end face of the inner pipe.

4. The heat transfer structure of claim 1, wherein the divertor first wall comprises a first material layer, a second material layer and a third material layer stacked in sequence from a side away from the first end of the outer pipe to a side close to the first end of the outer pipe; the first material layer is made of a tungsten material, the second material layer is made of an oxygen-free copper material, and the third material layer is made of a chromium zirconium copper (CrZrCu) material; the third material layer is integrally formed with the plurality of heat conduction columns; and the outer pipe is made of a stainless-steel material.

5. The heat transfer structure of claim 1, further comprising:

a connection part;

wherein the divertor first wall is connected with the first end of the outer pipe through the connection part; the divertor first wall comprises a first material layer and a second material layer stacked in sequence from a side away from the first end of the outer pipe to a side close to the first end of the outer pipe; the first material layer is made of a tungsten material, the second material layer is made of a tungsten-lanthanum alloy material, and the plurality of heat conduction columns are integrally formed with the second material layer; the connection part is made of a chromium zirconium copper (CrZrCu) material, and the outer pipe is made of a stainless-steel material.

6. A heat transfer structure of a divertor, comprising:

a divertor first wall;

a hydrophilic film;

an outer pipe;

an inner pipe; and a condenser pipe;

wherein the outer pipe is sleevedly provided on the inner pipe; the divertor first wall is arranged at a first end of the outer pipe; the divertor first wall, an inner wall of the outer pipe and an outer wall of the inner pipe are configured to enclose a flow chamber; an end of the inner pipe facing toward the divertor first wall is provided with a jet hole; the flow chamber is communicated with an interior of the inner pipe through the jet hole; and the hydrophilic film is arranged on a side of the divertor first wall facing toward the jet hole, and is fixedly connected with the divertor first wall; and the outer pipe is provided through the condenser pipe, and an axial direction of the outer pipe intersects with an axial direction of the condenser pipe; and an outer wall of the outer pipe and an inner wall of the condenser pipe are configured to enclose a coolant channel.

7. The heat transfer structure of claim 6, wherein a hydrophobic layer is provided on the inner wall of the outer pipe, and the hydrophobic layer is provided at least partially opposite to the coolant channel.

8. The heat transfer structure of claim 6, wherein the outer pipe comprises a first cylinder segment, a cone segment and a second cylinder segment connected in sequence; a diameter of the first cylinder segment is greater than a diameter of the second cylinder segment; an end of the first cylinder segment away from the cone segment is configured as the first end of the outer pipe, and an end of the second cylinder segment away from the cone segment is configured as a second end of the outer pipe; and at least part of the second cylinder segment and at least part of the cone segment are located within the condenser pipe.

* * * * *